United States Patent
Santiesteban

(10) Patent No.: US 12,178,166 B2
(45) Date of Patent: Dec. 31, 2024

(54) DYNAMIC REVERSIBLE MULTI-CROSS SECTION UNIVERSAL MODULAR DRIVELINE COUPLER

(71) Applicant: Theodore George Santiesteban, Daphne, AL (US)

(72) Inventor: Theodore George Santiesteban, Daphne, AL (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 18/206,182

(22) Filed: Jun. 6, 2023

(65) Prior Publication Data

US 2023/0309470 A1    Oct. 5, 2023

Related U.S. Application Data

(62) Division of application No. 17/132,564, filed on Dec. 23, 2020, now Pat. No. 11,723,322.

(51) Int. Cl.

| | | |
|---|---|---|
| F16D 3/46 | (2006.01) | |
| A01G 25/09 | (2006.01) | |
| F16D 1/08 | (2006.01) | |
| F16D 1/104 | (2006.01) | |
| F16D 3/68 | (2006.01) | |
| F16D 1/10 | (2006.01) | |

(52) U.S. Cl.
CPC ......... *A01G 25/092* (2013.01); *F16D 1/0847* (2013.01); *F16D 1/0864* (2013.01); *F16D 1/104* (2013.01); *F16D 3/46* (2013.01); *F16D 3/68* (2013.01); *F16D 2001/102* (2013.01)

(58) Field of Classification Search
CPC ....... A01G 25/092; F16D 3/46; F16D 1/0847; F16D 1/0864; F16D 2001/102; F16D 1/104; F16D 3/68
See application file for complete search history.

(56) References Cited

U.S. PATENT DOCUMENTS

| | | | | |
|---|---|---|---|---|
| 548,191 | A * | 10/1895 | Griscom | F16B 7/0413 403/301 |
| 1,512,246 | A * | 10/1924 | Slonecker | F16D 3/24 464/151 |
| 6,755,363 | B2 * | 6/2004 | Weatherl | A01G 25/092 239/743 |
| 6,840,862 | B2 * | 1/2005 | Daniel | F16D 1/0864 464/93 |
| 8,257,184 | B1 * | 9/2012 | Cordes | F16D 3/265 464/73 |
| 9,022,872 | B2 * | 5/2015 | Daniel | F16D 3/16 464/73 |
| 11,454,286 | B2 * | 9/2022 | Bettenhausen | F16D 1/0864 |

(Continued)

*Primary Examiner* — Ryan J. Walters
(74) *Attorney, Agent, or Firm* — George L Williamson

(57) ABSTRACT

Apparatus and method for an improved driveline coupler having a reversible saddle thereon which allows it to be configured to work with different sizes and shapes of shafts. The reversible saddle is configured on one side to work with one size of driveline shaft and configured on the opposite side to work with a different size driveline shaft so that, in the field, an operator can modify the driveline coupler from use with a first size of drive shaft to a second size of drive shaft easily and quickly by turning the saddle upside down.

12 Claims, 8 Drawing Sheets

(56) References Cited

U.S. PATENT DOCUMENTS

| | | | |
|---|---|---|---|
| 11,723,322 B2* | 8/2023 | Santiesteban | F16D 1/0864 239/723 |
| 2004/0121845 A1* | 6/2004 | Delaney | B25B 23/0014 464/158 |

* cited by examiner

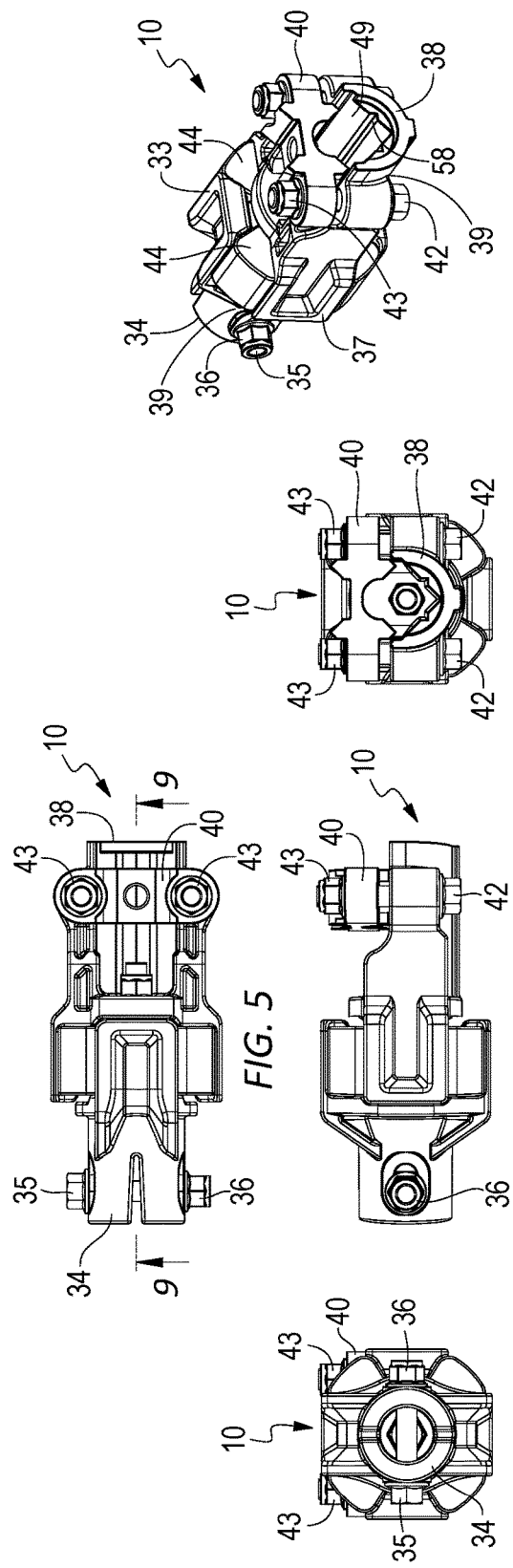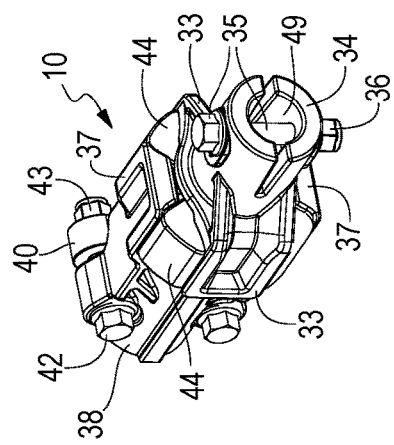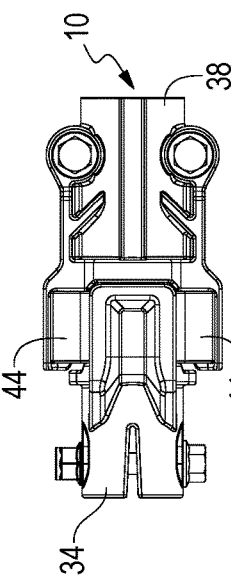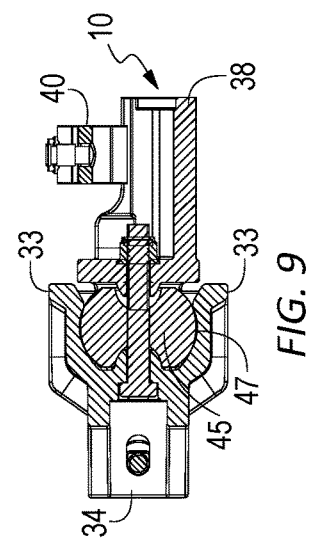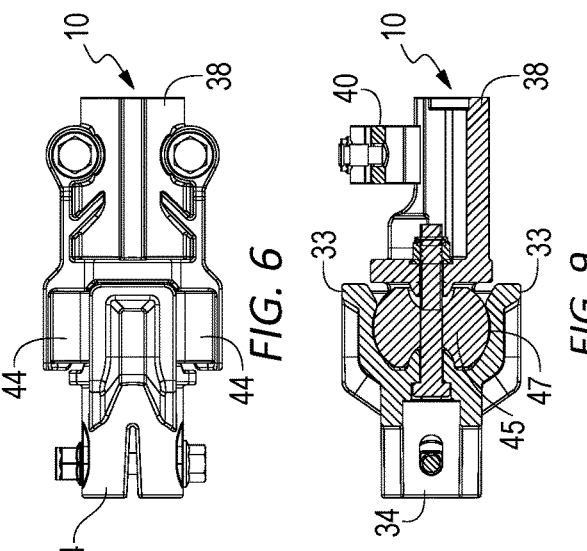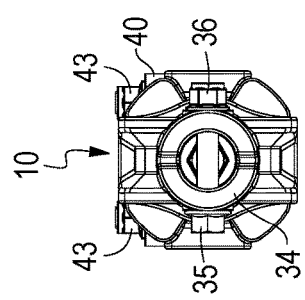

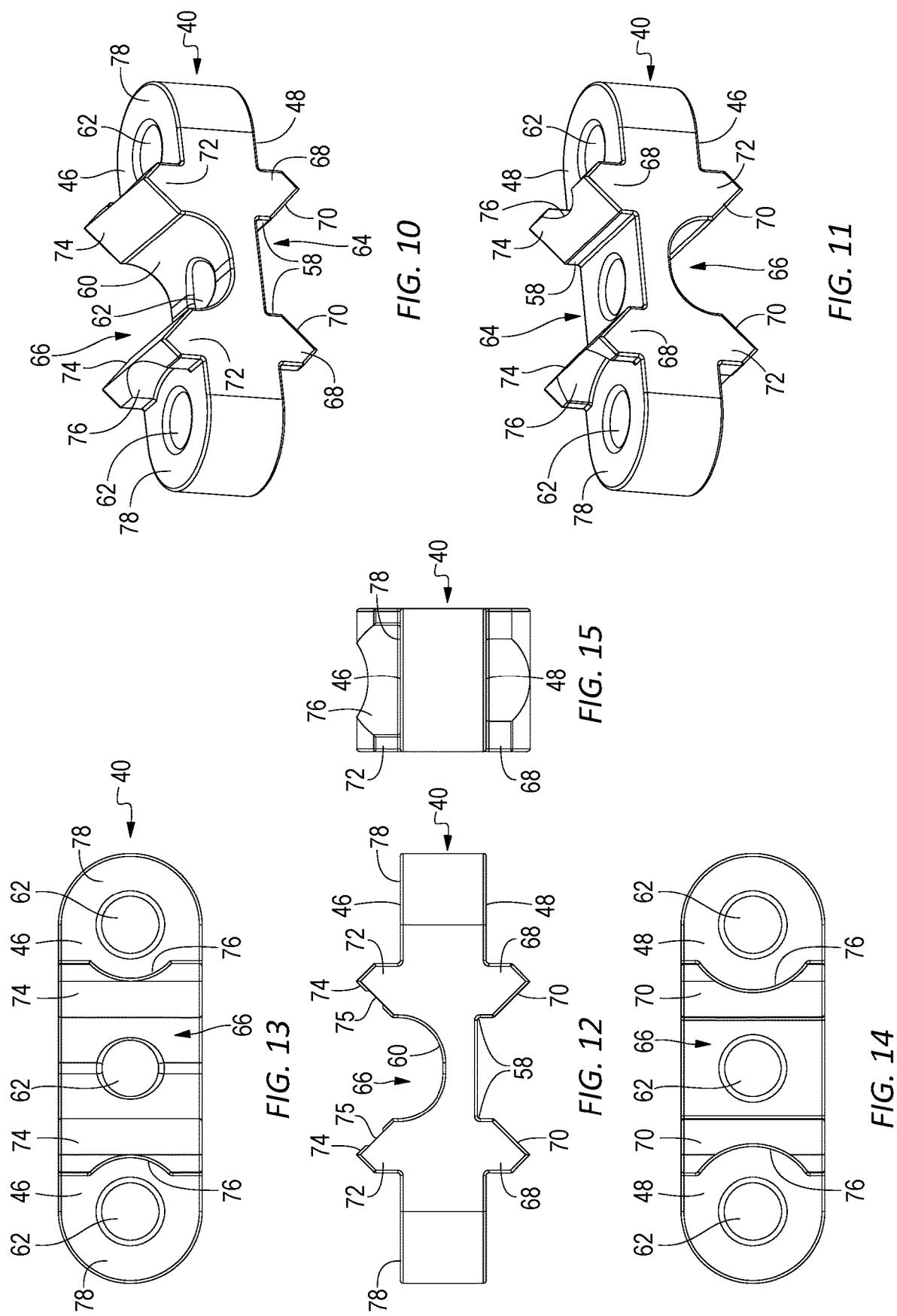

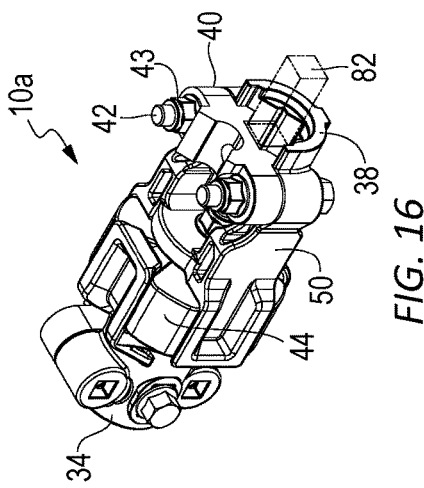
FIG. 16
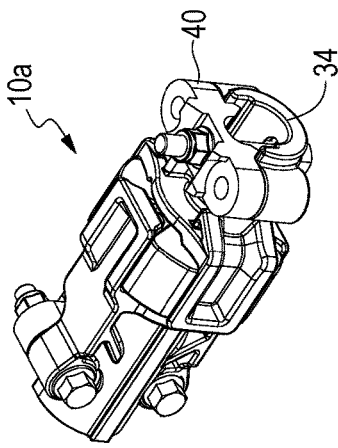
FIG. 17
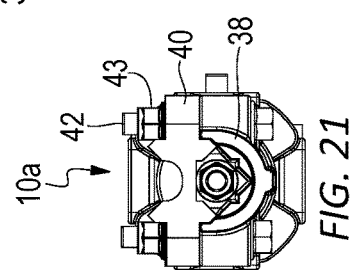
FIG. 21
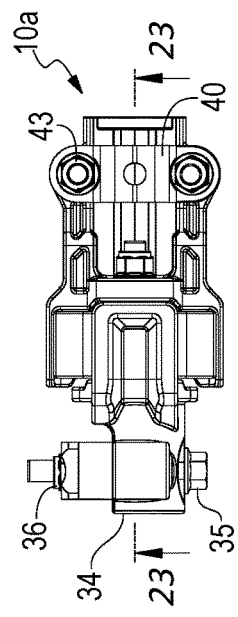
FIG. 19
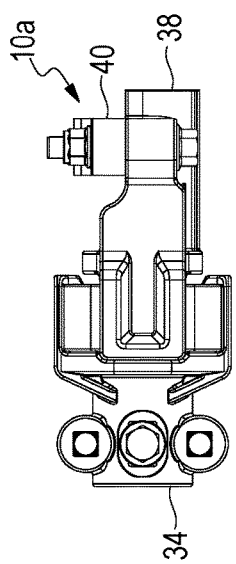
FIG. 18
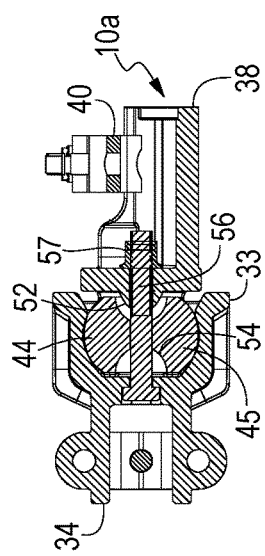
FIG. 20
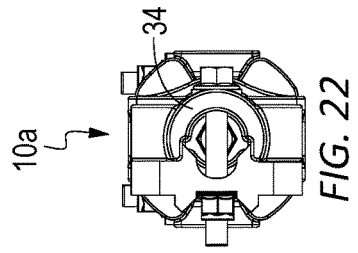
FIG. 22
FIG. 23

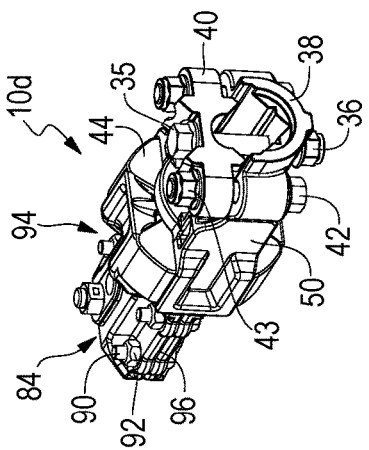
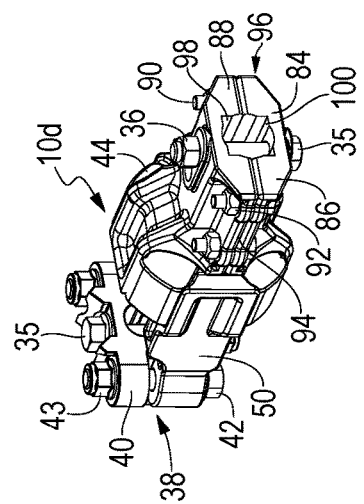
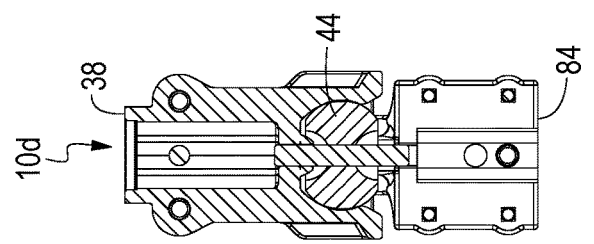
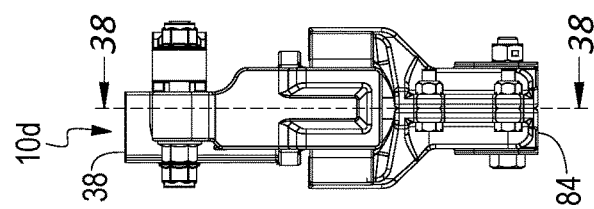
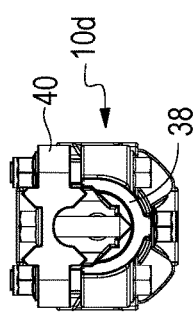
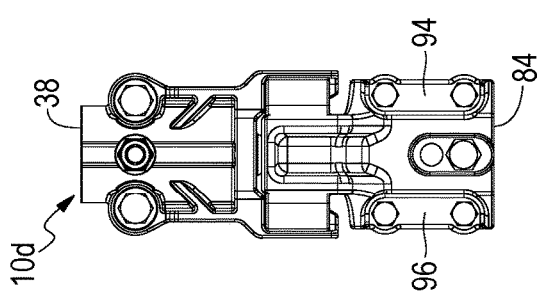
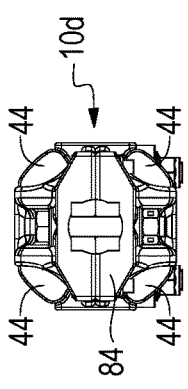
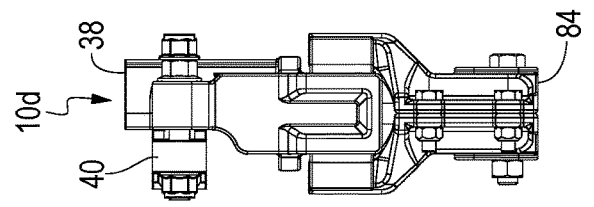

DYNAMIC REVERSIBLE MULTI-CROSS SECTION UNIVERSAL MODULAR DRIVELINE COUPLER

RELATED APPLICATIONS

This is a Divisional application of U.S. patent application Ser. No. 17/132,564 filed on Dec. 23, 2020, which claimed benefit of U.S. Provisional Patent Application No. 63/035,375 filed on Jun. 5, 2020.

BACKGROUND OF THE INVENTION

Field of the Invention

The present invention relates generally to driveline couplers for connecting drive train components, and more particularly, is concerned with a driveline coupler having a reversible saddle for operation with different sizes and shapes of drive shafts.

Description of the Related Art

Devices relevant to the present invention have been described in the related art; however, none of the related art devices disclose the unique features of the present invention.

In U.S. Pat. No. 8,257,184 dated Sep. 4, 2012, Cordes, et al., disclosed a driveline coupler including an insert member along with a center pin; however, this driveline coupler is not adapted to work with nor does it disclose a reversible saddle. In U.S. Pat. No. 6,755,363 dated Jun. 29, 2004, Weatherl, et al., disclosed a high torque driveline coupler in the nature of a split coupler including a rounded body member for mating into a receptacle of a PUC-like member, however, this driveline coupler was not adapted to work with nor does it disclose a reversible saddle. In U.S. Pat. No. 6,840,862 dated Jan. 11, 2005, Daniel disclosed a universal coupler for agricultural drive systems with an adjustable clamping hub; however, this driveline coupler is not adapted to work with nor does it disclose a reversible saddle. In U.S. Patent Application Publication No. 2001/0025894 dated Oct. 4, 2001, Weatherl, et al., disclosed a high torque driveline coupler in the nature of a split coupler including a rounded body member for mating into a receptacle of a PUC-like member, however, this driveline coupler is not adapted to work with nor does it disclose a reversible saddle. In U.S. Pat. No. 9,022,872 dated May 5, 2015, Daniel disclosed a drive shaft coupling mechanism; however, this drive shaft coupler is not adapted to work with nor does it disclose a reversible saddle. In U.S. Patent Application Publication No. 2004/0121843 dated Jun. 24, 2004, Daniel disclosed a universal coupler for agricultural drive systems with an adjustable clamping hub; however, this coupler is not adapted to work with nor does it disclose a reversible saddle. In U.S. Patent Application Publication No. 2014/0228133 dated Aug. 14, 2014, Daniel, et al., disclosed a drive shaft coupling mechanism; however, this coupler is not adapted to work with nor does it disclose a reversible saddle. In Great Britain Patent Application No. GB418,541 dated Nov. 25, 1933, Mollart, et al., disclosed an improvement related to universal joints; however, this universal joint is not adapted to work with nor does it disclose a reversible saddle. In China Patent No. CN 201010565789.7A dated Nov. 30, 2010, an unknown inventor disclosed a universal joint; however, it is not adapted to work with nor does it disclose a reversible saddle. Furthermore, none of the related art discloses modularity of the device.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses an improved driveline coupler having a reversible saddle thereon which allows the driveline coupler to be configured to work with different sizes and shapes of drive shafts, including square shafts and round shafts. The reversible saddle is configured on one side to work with one size of driveline shaft and configured on the opposite side to work with a different size driveline shaft so that, in the field, an operator can modify the driveline coupler of the present invention from use with a first size of drive shaft to a second size of drive shaft easily and quickly by simply reversing the saddle, i.e., by turning it over. The reversible configuration, as opposed to a one sided design also provides for a wider range of sizes and configurations.

An object of the present invention is to provide a driveline coupler which utilizes a reversible saddle for operation with round and square shafts and other types of shafts. A further object of the present invention is to provide a driveline coupler having a reversible saddle for use with different sizes of square round and triangular shafts (from ¾" to 1³⁄₁₆") in size while also being compatible with a one inch round shaft. A further object of the present invention is to provide a driveline coupler which utilizes a reversible saddle that can act as the sacrificial component within the driveline coupler if the driveline is overloaded. A further object of the present invention is to provide a driveline coupler which can be more easily used in the field for adaptation to various sizes of drive shafts. A further object of the present invention is to provide a driveline coupler which can be more easily interchangeable with spare parts from other types and brands of driveline couplers. A further object of the present invention is to provide a driveline coupler which can be easily operated by a user. A further object of the present invention is to provide a driveline coupler which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 2 is a perspective view of a first end of the present invention.

FIG. 3 is a perspective view of a second end of the present invention.

FIG. 4 is a side view of the present invention.

FIG. 5 is a top view of the present invention.

FIG. 6 is a bottom view of the present invention.

FIG. 7 is a right end view of the present invention.

FIG. 8 is a left end view of the present invention.

FIG. 9 is a cross sectional view of the present invention taken from FIG. 5 as indicated.

FIG. 10 is a perspective view of one side of the saddle of the present invention.

FIG. 11 is a perspective of a second side of the saddle of the present invention.

FIG. 12 is a side view of the saddle of the present invention.

FIG. 13 is a top view of the saddle of the present invention.

FIG. 14 is a bottom view of the saddle of the present invention.

FIG. 15 is an end view of the saddle of the present invention.

FIG. 16 is a perspective view of a first end of the second embodiment of the present invention.

FIG. 17 is a perspective view of a second end of the second embodiment of the present invention.

FIG. 18 is a side view of the second embodiment of the present invention.

FIG. 19 is top view of the second embodiment of the present invention.

FIG. 20 is a bottom view of the second embodiment of the present invention.

FIG. 21 is a right end view of the second embodiment of the present invention.

FIG. 22 is a left end view of the second embodiment of the present invention.

FIG. 23 is a cross sectional view of the second embodiment of the present invention taken from FIG. 19 as indicated.

FIG. 31 is a perspective view of a first end of the fifth embodiment of the present invention.

FIG. 32 is a perspective view of a second end of the fifth embodiment of the present invention.

FIG. 33 is a side view of the fifth embodiment of the present invention.

FIG. 34 is a bottom view of the fifth embodiment of the present invention.

FIG. 35 is a side view of the fifth embodiment of the present invention.

FIG. 36 is a right end view of the fifth embodiment of the present invention.

FIG. 37 is a left end view of the fifth embodiment of the present invention.

FIG. 38 is a cross sectional view of the fifth embodiment of the present invention taken from FIG. 35 as indicated.

LIST OF REFERENCE NUMERALS

Figure 1:
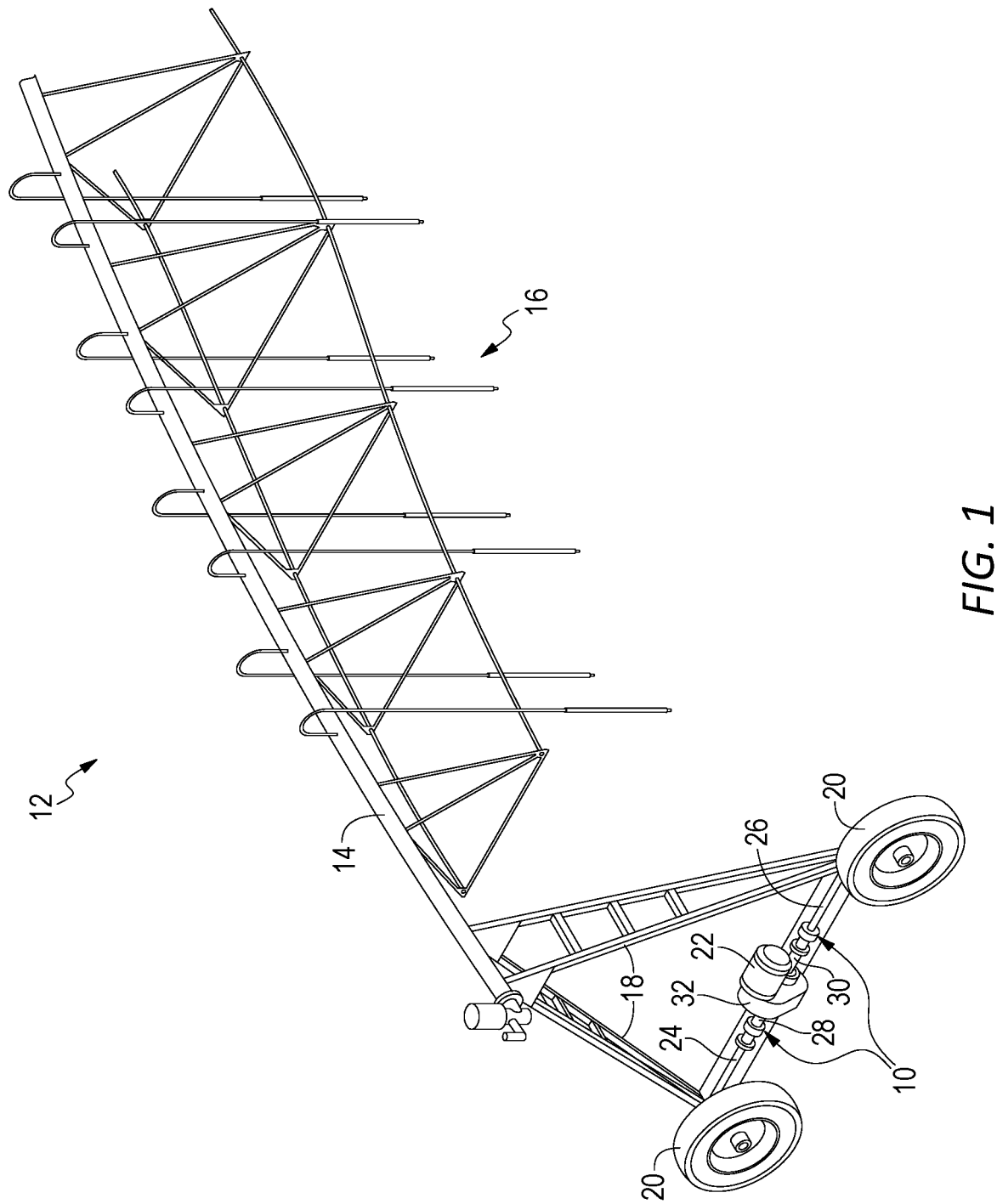
FIG. 1 is a perspective view of the present invention shown in operative connection on a sprinkler irrigation system.

With regard to reference numerals used, the following numbering is used throughout the drawings.

10 present invention
10*a* alternate embodiment of present invention
10*b* alternate embodiment of present invention
10*c* alternate embodiment of present invention
10*d* alternate embodiment of present invention
11*a* driveline coupler
11*b* driveline coupler
11*c* driveline coupler
12 sprinkler irrigation system
14 water irrigation conduit
16 water piping and delivery system
18 support tower
20 supporting wheel assemblies
22 drive motor
24 first drive shaft
26 second drive shaft
28 first output shaft
30 second output shaft
32 center gear box
33 leg
34 round load arm
35 retainer bolt
36 nut
37 leg
38 square load arm
39 base portion of load arm
40 reversible saddle
41 integrated saddle
42 bolt
43 nut
44 Polyurethane Coupler (PUC)/insert member
45 central portion
46 first side of reversible saddle
47 arm
48 second side of reversible saddle
49 opening
50 body of driveline coupler
52 PUC centering protrusion (variable size?)
54 receptacle for PUC centering protrusion
56 center pin
57 nut
58 grooves
60 semi-circular cutout
62 aperture 64 recess
66 recess
68 projection
70 angular surface
72 projection
74 angular surface
75 indention
76 recess
78 bolt pad
80 round shaft
82 square shaft
84 split load arm
86 first split load arm member
88 second split load arm member
90 threaded fastener
92 nut
94 side flange
96 side flange
98 recess
100 recess

DETAILED DESCRIPTION OF THE
PREFERRED EMBODIMENT(S)

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 44 illustrate the present invention wherein an improved driveline coupler is disclosed and which is generally indicated by reference number 10.

Turning to FIG. 1, therein is shown the present invention 10 being a driveline coupler which is used as a part of a sprinkler irrigation system 12 which includes a water irrigation conduit 14 which delivers water to a water piping and delivery system 16 for application to, e.g., an agricultural crop which would be disposed underneath the water piping and delivery system. The sprinkler irrigation system 12 is carried by a pair of support towers 18 (in a field operation the system 12 could include several support towers 18. e.g., four) which are transported on a pair of ground contacting supporting wheel assemblies 20 which move the sprinkler irrigation system 12 from one location to another location. The wheel assemblies 20 are powered by a drive motor 22 which is commonly electrically operated and which drives the wheels 20 through first and second drive shafts 24, 26 which are connected to output shafts 28 and 30 of a center gearbox 32 by a first and second driveline coupler 10 designed according to the teachings of the present invention.

Turning to FIGS. 2-9, therein is shown a first embodiment of the present invention 10 being a driveline coupler. Turning more specifically to FIG. 2, therein is shown a driveline coupler designed according to the teachings of the present invention 10, having a round load arm 34 on one end which includes a ⅜ inch (bolt size can vary depending on regional availability, such as metric equivalent or substitute) nut 36 with mating retainer bolt 35, and, on the other end a square load arm 38 along with a reversible saddle 40 adaptable for use with round, square ¾" to 1", triangular, and octagonal drive shaft cross sections. Saddle 40 is joined together by a bolt 42 with mating ⅜ inch nut 43; and, base portion 39 of the load arms is also shown. (All dimensions provided in this application for component parts such as nuts and bolts are approximate). The reversible saddle 40 and base portion 39 together contain an opening 49 for receiving a shaft so that the saddle 40 is circumferentially contractible about the shaft. The present invention could be called a dynamic reversible multi-cross section universal modular coupler. Other cross sections such as octagonal could also be used with the present invention. Also shown is a Polyurethane Coupler (PUC) or insert member 44 between the two load arms 34,38. The driveline coupler of the present invention 10 provides a universal design which allows it to work with a 1" (nominal dimension) round shaft along with square shafts sized ⅝ inch, ⅞ inch, and sizes up to 1³⁄₁₆". Also, larger sizes such as 1³⁄₁₆" (about 30 mm) or even larger sizes can also be envisioned for high speed, or continuous move, and/or larger systems or applications requiring more shaft torque load handling capacity. One skilled in the art would understand that shaft sizes or shapes can be scaled larger or smaller to accommodate other applications. Also, one skilled in the art would understand that the present invention 10 provides a modular platform allowing for multiple shaft configurations, sizes, cross sections, and retrofittable with other compatible load arms and PUCs. The present invention 10 also allows for easy interchange with or retrofitting with other type saddles and other parts from other brands of driveline couplers which might be found in the field. Note that the driveline coupler of the present invention 10 uses no shims, i.e., it is shimless, so that it can be more easily changed from operation with one size of square shaft to a second size of square shaft and also including multiple sizes and cross sections of drive shafts, while maintaining axial or non-axial alignment of the input and output shafts secured on either side of the coupler. Additionally, it is also envisioned that the modularity of the invention would allow the use of two round load arms 34, to be used in conjunction on one side of the drivetrain mounting as shown in FIG. 31. Turning more specifically to FIG. 3, therein is shown on one end of the present invention 10 the round load arm 34 with the retainer bolt 35 and mating nut 36. On the other end is shown the square load arm 38, saddle 40, and bolt 42 and mating nut 43. PUC 44 is also shown between the two load arms 34,38. Also shown is opening 49.

A retainer bolt 35 is the preferred bolt to use with the present invention 10 because they have a short portion immediately beneath the head formed into a square section, i.e., a carriage style bolt, which makes the bolt self locking when placed through a square hole in a mating metal piece which allows the nut 36 to be installed with only a single tool working from only one side of bolt 35. Additionally, the coupler is preassembled and utilizes a limited number of larger bolts, making them easier to handle, harder to drop, and easier to find if they are dropped. This makes the job of changing parts of the present invention 10 in the field easier because only one tool is needed to complete the job. The retainer bolt 35 passes through a mating aperture in the shaft so that the shaft is secured and thereby prevented from rotation within the load arm.

The square load arm 38 of the present invention 10, as illustrated in FIGS. 2 and 5 for example, is somewhat elongated to allow for positioning of the drive shaft within the square load arm because in the field the length of the drive shaft cannot be readily modified and thus the driveline coupler must be adaptable to fit on and cooperate with various lengths and types of drive shafts so that it will function correctly under a variety of field conditions. The inside surface of square load arm 38 is also provided with grooves 58 for receiving an edge of a square drive shaft so that the drive shaft is secured inside the load arm.

Turning to FIGS. 10-15, therein is shown a reversible saddle 40 designed according to the teachings of the present invention 10. FIG. 10 shows one side 46 on top while FIG. 11 shows the opposite side 48 on top. When side 46 of the reversible saddle 40 is oriented inwardly on the driveline coupler of present invention 10 as illustrated in FIG. 2, it can accept square shafts of a first size and when the reversible saddle 40 is flipped over so that the opposite side 48 is oriented inwardly on the driveline coupler it is sized so as to allow it to accept a second size of square shaft and also including multiple shaft sizes and cross-sections up to 1³⁄₁₆". Simply flipping the saddle 40 over allows it to operate with different sizes of square drive shafts. Side 48 has grooves 58 provided which generally form a recess 64 formed by a pair of opposite, mating projections 68 having mating inwardly disposed angular surfaces 70 thereon which allow it to be adjustably sized to fit a range of sizes of square and triangular shafts. These surfaces may also incorporate scallops, arcs, curvatures, and/or other shape augmentations to better accommodate multiple safe sizes and configurations, as illustrated in FIG. 32, item 100. Side 46 has a semicircular cutout area 60 (which reduces the load concentration) provided which generally form a recess 66 formed by a pair of opposite, mating projections 72 having mating inwardly disposed angular surfaces 74 thereon which allow it to be adjustably sized to fit a range of different sizes of square and triangular shafts. Each projection 68, 72 has a small recess 76 provided for allowing room for placement of a nut on a mating bolt passing through aperture 62. A plurality of apertures 62 are provided to receive through bolts to attach the saddle 40 to a driveline coupler of the present invention 10. In order to build a saddle 40 so as to work with any particular size of square shaft, the height/length of and distance between the mating pairs of projections 68, 72 is varied along with the angle of the angular surfaces 70, 74. The areas 78 on either end of saddle 40 are sometimes referred to as bolt pads 78 and the distance between them could also be adjusted for changing the size of the saddle to fit different sizes of drive shafts. FIG. 12 also shows optional indentions or scallops 75 disposed on angular surface 74 of projections 72 (indentions could also be placed on projections 68 at the discretion of a user) wherein the surface is relieved by having part of the surface be cut-away with indentions/scallops so as to better fit to a round shaft.

Turning to FIGS. 16-23, and more specifically to FIG. 16, therein is shown a second embodiment 10*a* of the present invention including a reversible saddle 40, the bolt 42 having nut 43 thereon along with the body 50 which includes a PUC 44 disposed between the round load arm 34 and the square load arm end 38. Turning to FIG. 23, embodiment 10*a* of the present invention includes a PUC centering protrusion 52 which is a bump-like protrusion, which may be referred to as a ball and socket, mounted on one or both of the load arms 34, 38 of the present invention so that it centers, i.e., aligns, and secures the PUC 44 between the load arms. The protrusions 52 can be varied in size and shape. The PUC centering protrusion 52 is designed to fit into a mating receptacle 54 formed into the PUC 44 and may include an optional center pin 56 with mating nut 57 which may or may not be included in the alternative embodiment 10*a*. FIG. 16 also shows the orientation of a ¾" square shaft 82 within the opening of the square load arm 38 with recess 66 (see FIG. 12) of saddle 40 turned away from the opening of the square load arm 38. Other previously disclosed elements may also shown.

Figure 24:
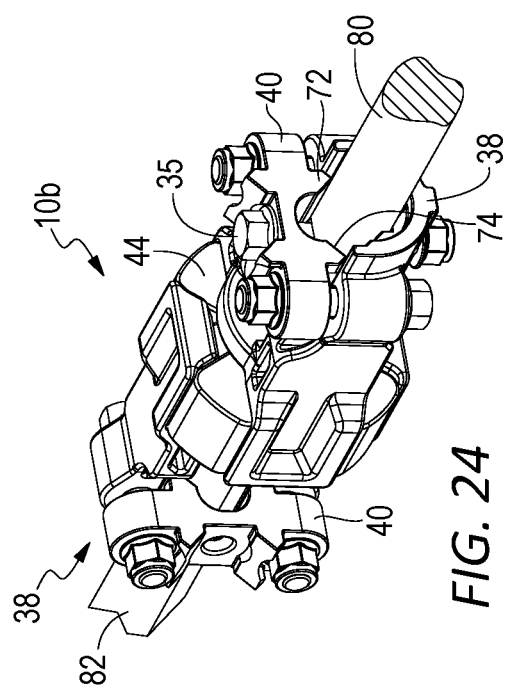
FIG. 24 is a perspective view of a first end of a third embodiment of the present invention.
Figure 25:
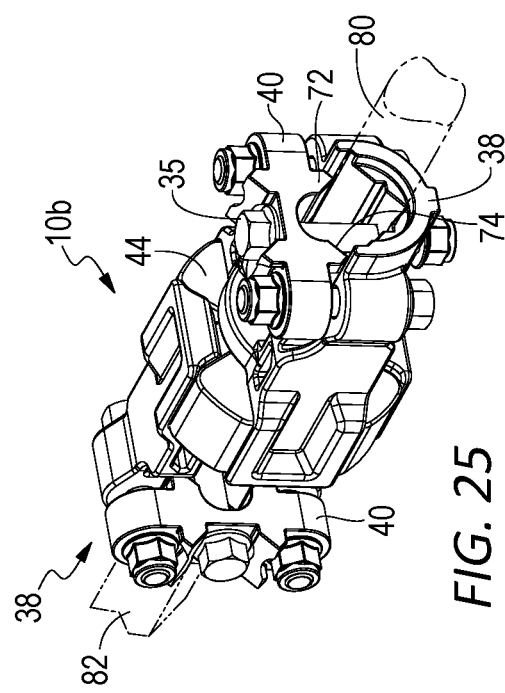
FIG. 25 is a perspective view of a first end of a third embodiment of the present invention.

Turning to FIGS. 24-25, therein is shown a third embodiment of the present invention 10*b* having a square load arm 38 on each end for receiving drive shafts. It can be seen that a round shaft 80 can be placed in a square load arm 38 so that the angular surfaces 74 of the projections 72 contact the outer surface of the round shaft 80 so as to secure the round shaft within the square load arm. Also shown is a retainer bolt 35 to assist in further securing the round shaft 80 in round load arm 34. A reversible saddle 40 is shown on each end of the present invention 10*b*. Other previously disclosed elements are also shown.

Figure 26:
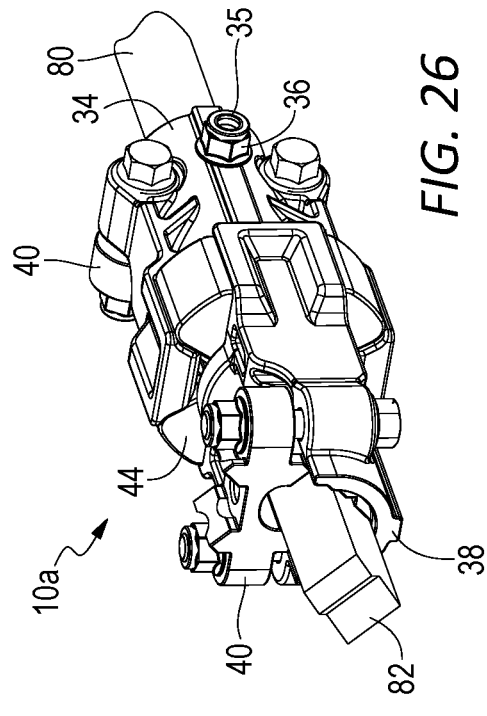
FIG. 26 is a perspective view of a second end of the second embodiment of the present invention.
Figure 27:
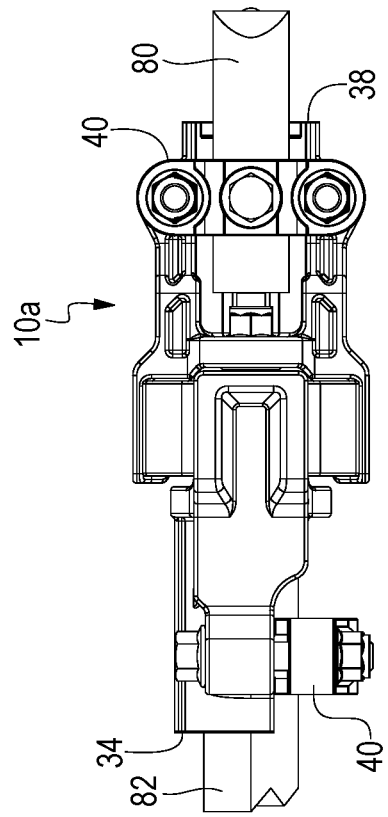
FIG. 27 is a side view of FIG. 26 showing the second embodiment of the present invention.

Turning to FIGS. 26-27, therein is shown the second embodiment of the present invention 10*a* having a square load arm 38 on one end and a round load arm 34 on the other end and also showing round shaft 80 and square shaft 82 placed within the corresponding load arm. Also shown is a retainer bolt 35 with mating nut 36. One skilled in the art would understand that saddle 40 cooperates with the load arm 34, 38 to completely encircle and secure a drive shaft 80, 82 to the load arm. Also shown in FIG. 26 is square shaft 82 which illustrates the orientation of a ⅞" square shaft within the opening of the square load arm 38 with the recess 66 of saddle 40 turned toward the opening. Other previously disclosed elements are also shown.

Figure 28:
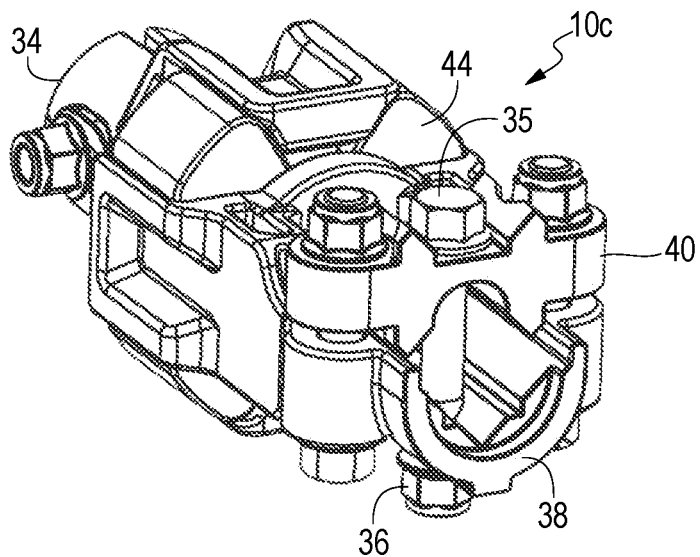
FIG. 28 is a perspective view of a first end of a fourth embodiment of the present invention.
Figure 29:
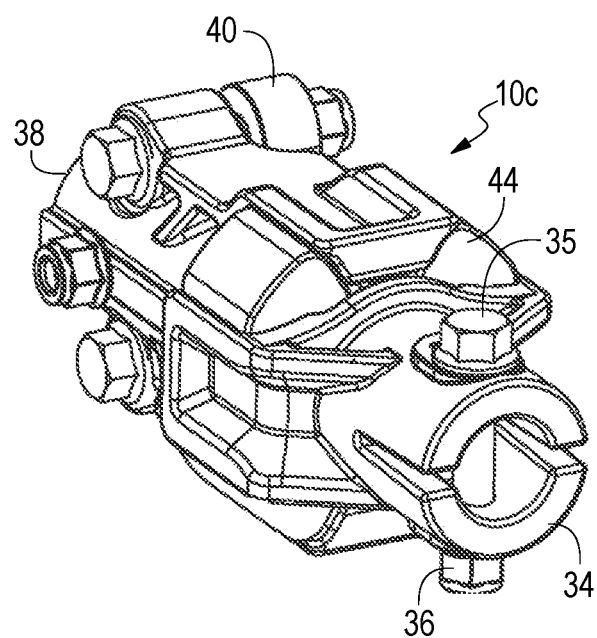
FIG. 29 is a perspective view of a second end of a fourth embodiment of the present invention.
Figure 30:
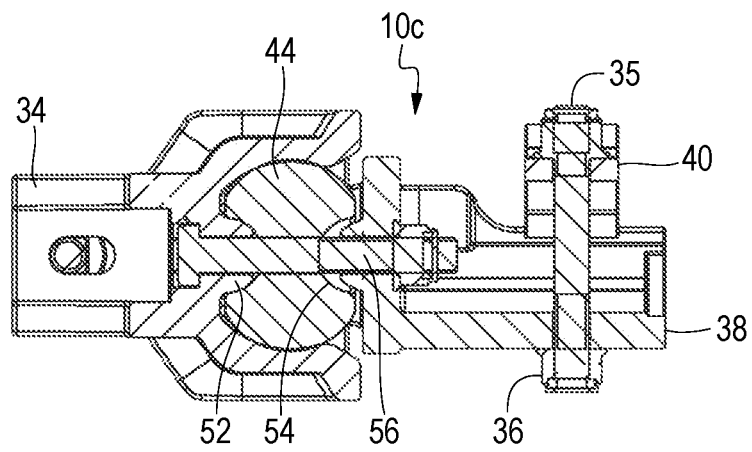
FIG. 30 is a cross sectional view of a fourth embodiment of the present invention.

Turning to FIGS. 28-30, therein is shown a fourth embodiment of the present invention 10*c* having a square load arm 38 on one end and a round load long load arm 34 on the other end and including a retainer bolt 35 and mating nut 36 on each load arm. Turning more specifically to FIG. 30, also shown is a PUC centering protrusion 52 which has been previously disclosed relative to FIG. 23 which aligns and secures the PUC 44 between the load arms. The PUC centering protrusion 52 is designed to fit into a mating receptacle 54 formed into the PUC 44 and may include an optional center pin 56 passing through a mating internal aperture which pin may or may not be included. Other previously disclosed elements are also shown.

Turning to FIGS. 31-38, and more specifically to FIG. 31-32, therein is shown a fifth embodiment 10*d* of the present invention having a square load arm 38 on one end and a split load arm 84 on the other end. The split load arm 84 has first and second load arm members 86, 88 adapted to be joined together by a plurality, e.g., four, threaded fasteners 90 extending through apertures in side flanges 94, 96. A recess 98, 100 is provided in each split load arm 84 which is complimentarily sized and shaped to receive a side of the shaft on which the load arm 84 is secured; a retainer bolt 35 with mating nut 36 is also shown. In operation, the first and second load arms 86, 88 are positioned on either side of a shaft with the end of the shaft positioned within the recesses 98, 100 so that the load arm 84 can be clamped tightly to the shaft by the threaded fastener 90. Also shown are the reversible saddle 40 with bolt 42 and nut 43, and, retainer bolt 35 and nut 36 thereon along with the body 50 which includes a PUC 44 disposed between the split load arm end 84 and the square load arm end 38. Other previously disclosed elements may also be shown.

Figure 39:
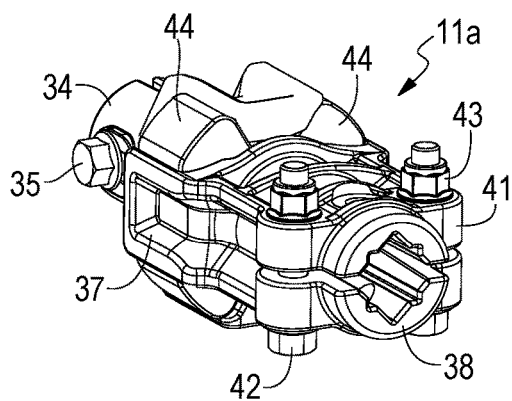
FIG. 39 is a perspective view of a first end of a driveline coupler related to the present invention.
Figure 40:
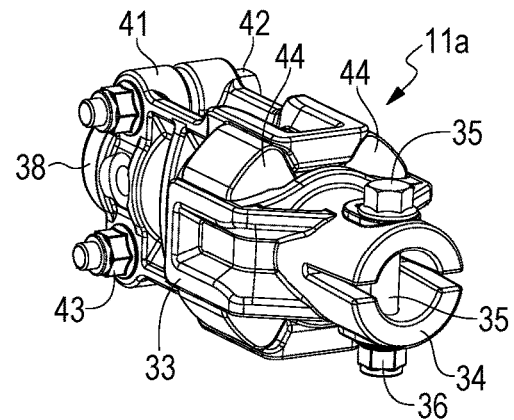
FIG. 40 is a perspective view of a second end of a driveline coupler related to the present invention.

Turning to FIGS. 39-40, therein is shown a driveline coupler 11a having a two-piece design including a round load arm 34 and a square load arm 38 having an integrated saddle 41. This driveline coupler 11a is dissimilar to the preferred embodiment and can only be used on two of four couplers, or on a complete tower driveline, or with an expandable driveshaft. Other previously disclosed elements are also shown.

Figure 41:
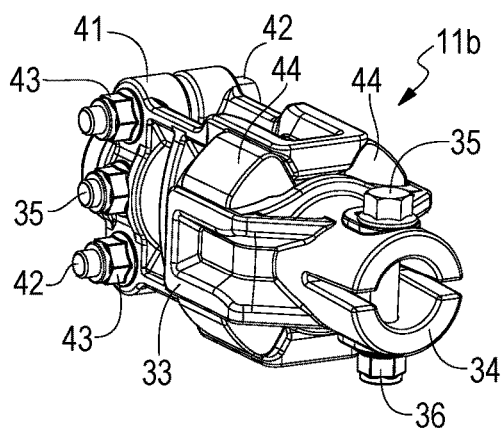
FIG. 41 is a perspective view of a first end of a driveline coupler related to the present invention.
Figure 42:
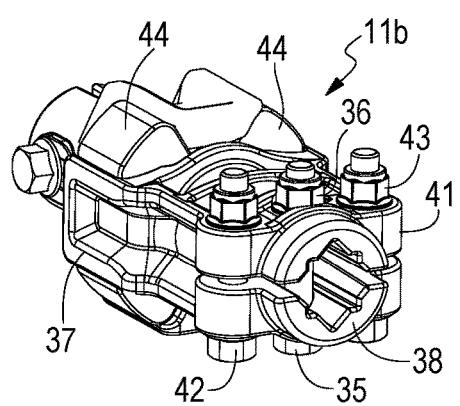
FIG. 42 is a perspective view of a second end of a driveline coupler related to the present invention.

Turning to FIGS. 41-42, therein is shown a driveline coupler 11*b* having a two-piece design. This design is similar to the design shown in FIGS. 39-40, however, it includes a retention bolt 35 on the round load arm 34 and on the square load arm 38 of the driveline coupler. Other previously disclosed elements are also shown.

Figure 43:
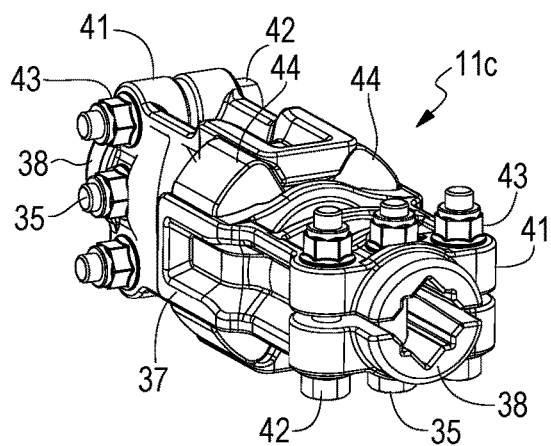
FIG. 43 is a perspective view of a first end of a driveline coupler related to the present invention.
Figure 44:
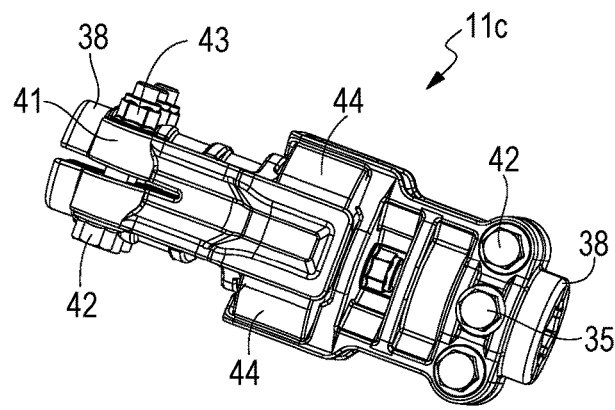
FIG. 44 is a perspective view of a second end of a driveline coupler related to the present invention.

Turning to FIGS. 43-44, therein is shown a driveline coupler 11c having a two-piece including a square load arm 38 on each end of the driveline coupler. The square load arm 38 can be used with round or square shafts. Again, this is not the preferred embodiment and can only be used on two of four couplers, on the complete tower driveline, or with an expandable driveshaft. Other previously disclosed elements are also shown.

FIGS. 39 through 44 are including in this application as a contrast to the present invention in order to demonstrate that the present invention uses a smaller number of aluminum components (2), and required load arm configurations (1) versus, e.g., the driveline coupler illustrated in FIGS. 43-44.

It should be clear that the present invention 10 can be built or configured into various embodiments because the round or square load arms 34, 38 can be combined with various other aspects of the invention including, e.g., the reversible saddle 40, the retainer bolt 35, the PUC centering protrusion 52, the center pin 56, the round shaft 80, or square shaft 82. Many embodiments could be designed by a user without departing from the scope of the invention. For example, some of the configurations follow: a through hole could be added onto the square load arm to allow a retainer bolt to pass through for retention of a round drive shaft; using a round load arm or square load arm with one saddle, or, with two saddles; using a split load arm; using a through hole for a retainer bolt for securing round or square shafts; using other drive shaft shapes. e.g., triangular, thereby making the present invention universal and modular; and, extending the modularity to using other types or brands of saddles.

The PUC 44 of the present invention is expected to be made of an elastomeric engineering grade thermoplastic, such as polyetherurethane, which is a non-hydroscopic material and being uniform in make-up. PUCs 44 may also be made of hydroscopic polyurethane or other similar engineering grade thermoplastic, or rubber. PUCs 44, being made of elastomeric material, serve as a shock absorbing material between the load arms of the present invention particularly on startup of the irrigation system. PUCs 44, along with the load arms 34, 38 and saddle 40, are considered a breakable, or fusible link in the drive train of the present invention.

An advantage of the reversible saddle 40 of the present invention is that no shims are required in order for it to fit onto an up to 1 inch square (or triangular) drive shaft which makes changing shafts in the field much easier. The present invention is also expected to be made of aluminum although any material that would be considered suitable to one skilled in the art could be used. The reversible saddle 40 is designed to permit it to support and be tightened around a shaft as the saddle is generally shaped to fit around the object, i.e., shaft, held therein and is circumferentially contractible around a shaft as it is configured to fit partially around a shaft just as the base 39 is configured to fit partially around the shaft within opening 49.

In summary and by reference to FIGS. 1-44, as would be understood by one skilled in the art, the present invention 10 discloses a driveline coupler having first and second load arms 34, 38, which have sometimes been referred to as yoke assemblies in the prior art. One of the load arms is expected to be connected to an output shaft 28, 30 from a gearbox 32 or motor 22 and the other load arm would normally be connected to a driveshaft 26, 28 of an irrigation system 12 as illustrated in FIG. 1. Each of the load arms 34, 38 has an opening 49 and a base portion 39 configured for connection to an output shaft or driveshaft and a pair of legs 33, 37, which have sometimes been referred to as being U-shaped in the prior art, wherein the legs extend away from the base portion so that the legs define a generally U-shaped member configured so that an open side of the U-shaped member faces axially away from the base portion as can be seen in, for example, FIGS. 2, 3, 9, and 23. The base portion 39 is a bulky area located generally between the end of the load arm where the drive shaft is inserted and the legs 33, 37. The legs are oriented with respect to each other so that they overlap each other being intermeshed; and the load arms may also be joined together by a center pin 56 with mating nut 57. When the driveline coupler of the present invention 10 is attached to a drive shaft, as illustrated in FIG. 1 for example, as would be done in the standard manner by one skilled in the art, the legs 33, 37 overlap each other and cooperate with each other so that when one drive shaft is rotated axially then the other drive shaft is rotated axially in response thereto. A PUC 44, which may have been referred to in the prior art as an insert member or shock absorber, is disposed between the overlapping legs of the first and second load arms 34, 38 for operation as disclosed elsewhere in this patent application wherein the PUC has a central portion 45 and a plurality of arms 47, e.g., four, extending radially from the center portion.

I claim:

1. A driveline coupler for a sprinkler irrigation system, comprising:
    a) a first load arm disposed on a first end of said driveline coupler connected to a first shaft;
    a second load arm disposed on a second end of said driveline coupler connected to a second shaft;
    c) a reversible saddle mounted on a portion of at least one of either said first or second load arm;
    d) wherein said reversible saddle is of one piece construction and has an upper side and a lower side, wherein said upper side has a concave shaped recess and is sized for a first size of either said first or second shaft and said lower side has grooves forming a recessed flat surface and is sized for a second size of either said first or second shaft; and
    e) wherein when said saddle is reversed to an upside down position it is adapted for use with different sizes and shapes of drive shafts.

2. The driveline coupler of claim 1, wherein either said first or second shaft is selected from the group consisting of a round shaft, a rectangular shaft, a triangular shaft, and an octagonal shaft.

3. The driveline coupler of claim 1, wherein said reversible saddle has a hole therein capable of receiving a retainer bolt.

4. The driveline coupler of claim 3, further comprising a retainer bolt disposed in said hole.

5. The driveline coupler of claim 1, further comprising a center pin disposed in at least one of either said first or second load arm.

6. The driveline coupler of claim 1, further comprising a PUC disposed between said first and second load arms, said PUC being made of material designed to absorb shock between said first and second load arms during startup of said sprinkler irrigation system.

7. The driveline coupler of claim 6, further comprising a centering protrusion mounted on at least one of said first and second load arms.

8. The driveline coupler of claim 1, wherein said driveline coupling is shimless to permit said driveline coupler to be more easily configured to accommodate drive shafts of differing shapes and sizes.

9. The driveline coupler of claim 1, wherein said reversible saddle further comprises a pair of projections each having an angular surface thereon to accommodate drive shafts of differing shapes and sizes.

10. A driveline coupler for a sprinkler irrigation system, comprising:
   a) a first load arm disposed on one end of said driveline coupler for receiving an output drive shaft from a source of power and a second load arm disposed on an opposite end of said driveline coupler for delivering power to a wheel drive shaft of a wheel assembly of said sprinkler irrigation system;
   b) said first load arm having an opening for receiving said output drive shaft from said source of power;
   c) said second load arm having an opening for receiving said wheel drive shaft;
   d) a reversible saddle mounted on a portion of at least one said openings of either said first or second load arm;
   e) wherein said reversible saddle is of one piece construction and has an upper side and a lower side, wherein said upper side has a concave shaped recess and is sized for a first size of either said first or second shaft and said lower side has grooves forming a recessed flat surface and is sized for a second size of either said first or second shaft; and
   f) wherein when said saddle is reversed to in an upside down position it is used with preselected different sizes and shapes of drive shafts.

11. The driveline coupler of claim 10, wherein either said output drive shaft or said wheel drive shaft is selected from the group consisting of a round shaft, a rectangular shaft, a triangular shaft, and an octagonal shaft.

12. The driveline coupler of claim 10, wherein said reversible saddle is capable of being broken if the driveline is overloaded.

* * * * *